Patented Oct. 11, 1932

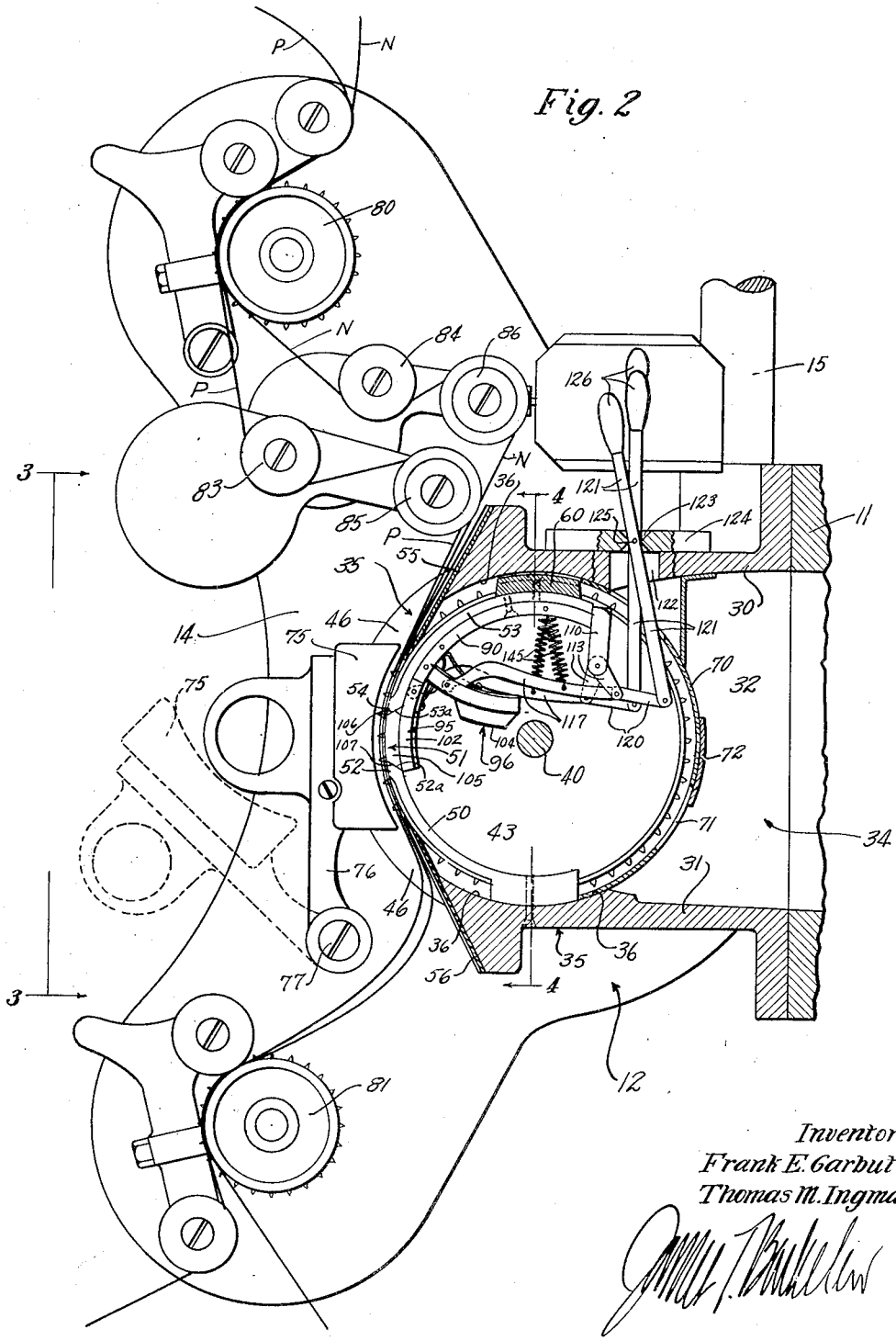

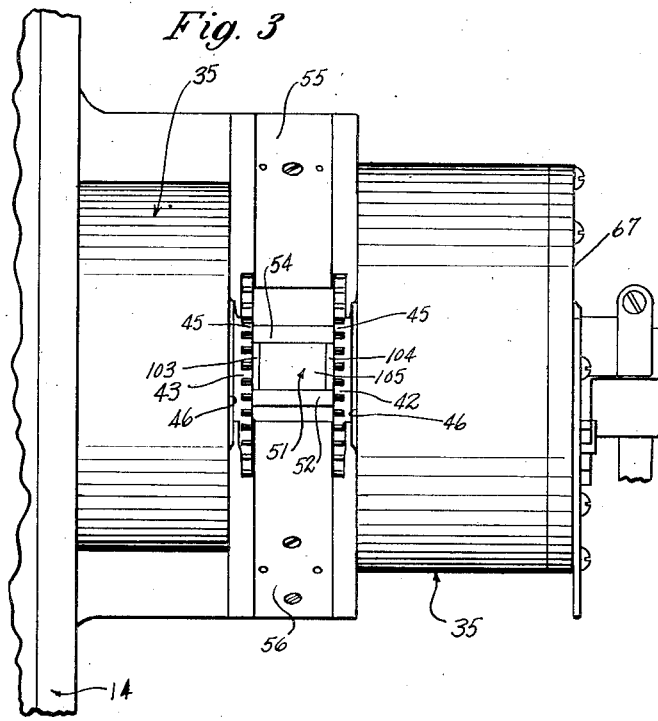
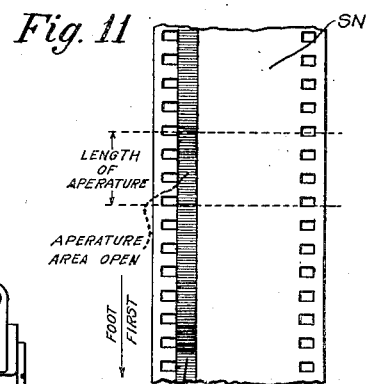
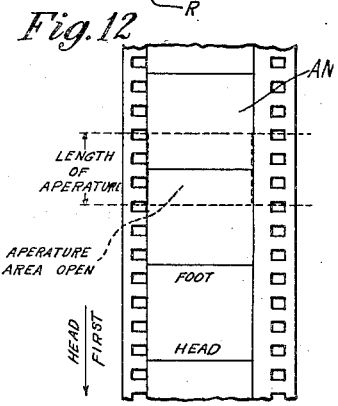
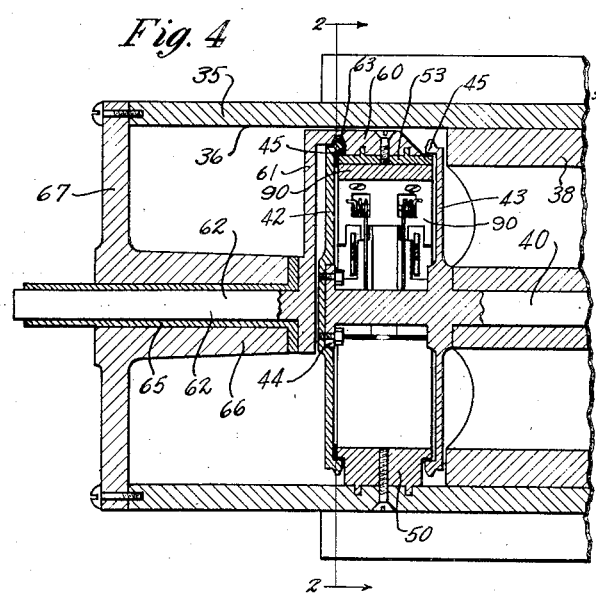
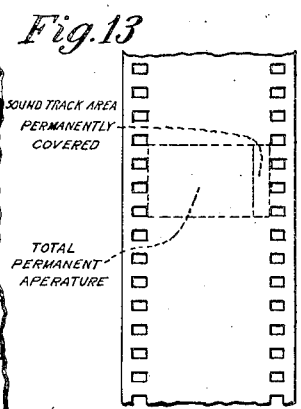

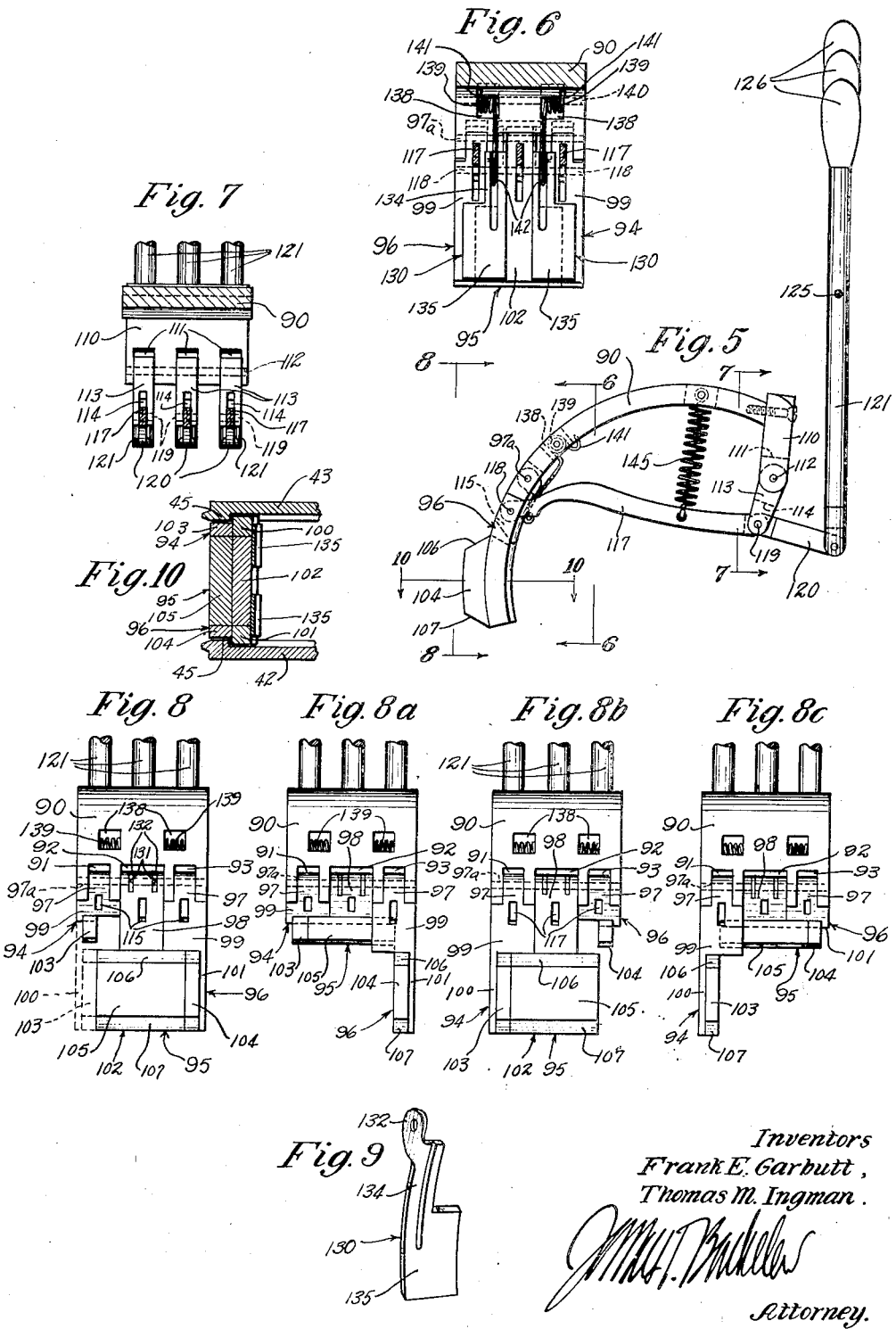

1,881,468

UNITED STATES PATENT OFFICE

FRANK E. GARBUTT AND THOMAS M. INGMAN, OF LOS ANGELES, CALIFORNIA, ASSIGNORS, BY DIRECT AND MESNE ASSIGNMENTS, TO PARAMOUNT PUBLIX CORPORATION, OF LOS ANGELES, CALIFORNIA, A CORPORATION OF NEW YORK

SOUND PICTURE PRINTER

Application filed May 20, 1929. Serial No. 364,514.

This invention has to do generally with the printing of sound motion pictures, and more particularly with certain improvements in sound picture printers which greatly simplify and facilitate the operations of printing sound picture positives of the type in which the sound record tract is located at the edge of the same film that carries the action, from two separate negative films having respectively the action and sound.

It is now general practice in the producing of sound pictures that the sound be originally recorded upon a separate film from that upon which the action is taken, the sound record and moving pictures or action being later both printed upon a single film for the preparation of projection positives. To print both the pictures and the sound track upon a single film from the two original negative films, it is simply necessary to mask the picture area of the film while the sound track is being printed, and then to mask the sound track area of the film while the pictures are being printed. For this purpose it has been proposed to mount a pair of masks in the printing aperture of the printer, one of the width of the sound track and one of the width of the picture area, either mask being adapted to swing back through its area of the aperture. Then with the picture area mask in position, and the sound track mask swung back out of position, the sound-record-negative film roll and a roll of fresh positive film are placed in the printer and run through, thereby printing the sound record on the positive, while the picture area of the positive is unaffected due to the presence of the picture area mask. The picture area mask is then swung back and the sound track mask moved to masking position. But before the positive can be placed back in the machine for the purpose of printing the pictures thereon, it must be rewound so that it can be run through the machine in the same direction as before, for the positive was reeled up in the reverse direction as the sound track was printed, and therefore, if this is not done, the sound track and picture area are reversed from right to left with respect to their respective masks. By "running the machine in the same direction as before" is meant that if the film is first run through the machine "head" first— that is, with the top or "head" of an individual picture proceeding ahead of the bottom or "foot" of the picture—that it will again be run through the machine head first, or, in this reverse, in the same direction. An analogous terminology is applied to the direction of travel of the sound track. When this rewinding operation is accomplished, the positive and the picture negative rolls may be placed in the machine and run through with the mask in the last described position, the sound track mask shielding the originally printed sound track, and the picture area mask being swung back to allow the pictures to be printed. Thus, according to this arrangement it is necessary that the films be always run through the machine either "head" first or "foot" first, depending upon whether the sound track mask is mounted at one edge or the other of the picture area mask, and therefore the positive film must always be rewound between the two printings. This rewinding entails much loss of time and efficiency, and is not only a great inconvenience, but increases the liability of fogging the undeveloped positive.

It is a primary object of this invention to provide means whereby the films may be run through the printer in either direction— either head first or foot first—for any of the printing operations, thus entirely obviating the necessity of such rewinding.

Generally speaking, this object is accomplished by providing the printer with two sound track masks, one at each side edge of the printing aperture, and with a third or intermediate mask between these two, all being adapted to swing individually into or out of masking position. When a sound record is being printed on the positive, the corresponding sound track mask is swung back and the other sound track mask and the intermediate mask, which for this purpose together comprise a single picture area mask, are swung forward or into masking position. When a picture is being printed, the one of the sound track masks which corresponds to the sound track area of the film is placed in masking position, while the other two masks are swung out of position to uncover the picture area. It is at once apparent that with this arrangement, printing can be done with the sound track at either edge of the pictures, depending upon whether the film is run through the machine "head" first or "foot" first, and upon whether it is desired that the sound track be at the right hand or the left hand edge of the finished picture, and that no rewinding is ever required.

The invention will be best understood from the following detailed description of a present preferred embodiment, reference for this purpose being had to the accompanying drawings, in which:

Fig. 2 is an enlarged vertical section of a part of the machine shown in Fig. 1, and exposing the device of the present invention in side elevation; this section being taken according to line 2—2 of Fig. 4;

Fig. 3 is a fragmentary side elevation, parts being removed, looking in the direction of arrows 3—3 in Fig. 2;

Fig. 4 is a vertical section taken on line 4—4 of Fig. 2;

Fig. 5 is a full size side elevation of the device of the present invention;

Fig. 6 is a vertical section taken on line 6—6 of Fig. 5;

Fig. 7 is a vertical section taken on line 7—7 of Fig. 5;

Figs. 8, 8a, 8b and 8c are front elevations taken in the direction of arrows 8—8 of Fig. 5, and showing the device in various operative positions;

Fig. 9 is a perspective view of a light shield;

Fig. 10 is a horizontal section taken on line 10—10 of Fig. 5;

Fig. 11 is a view showing a sound negative;

Fig. 12 is a view showing an action negative; and

Fig. 13 is a diagrammatic view showing the relation of the printing aperture to the film.

Figure 1:
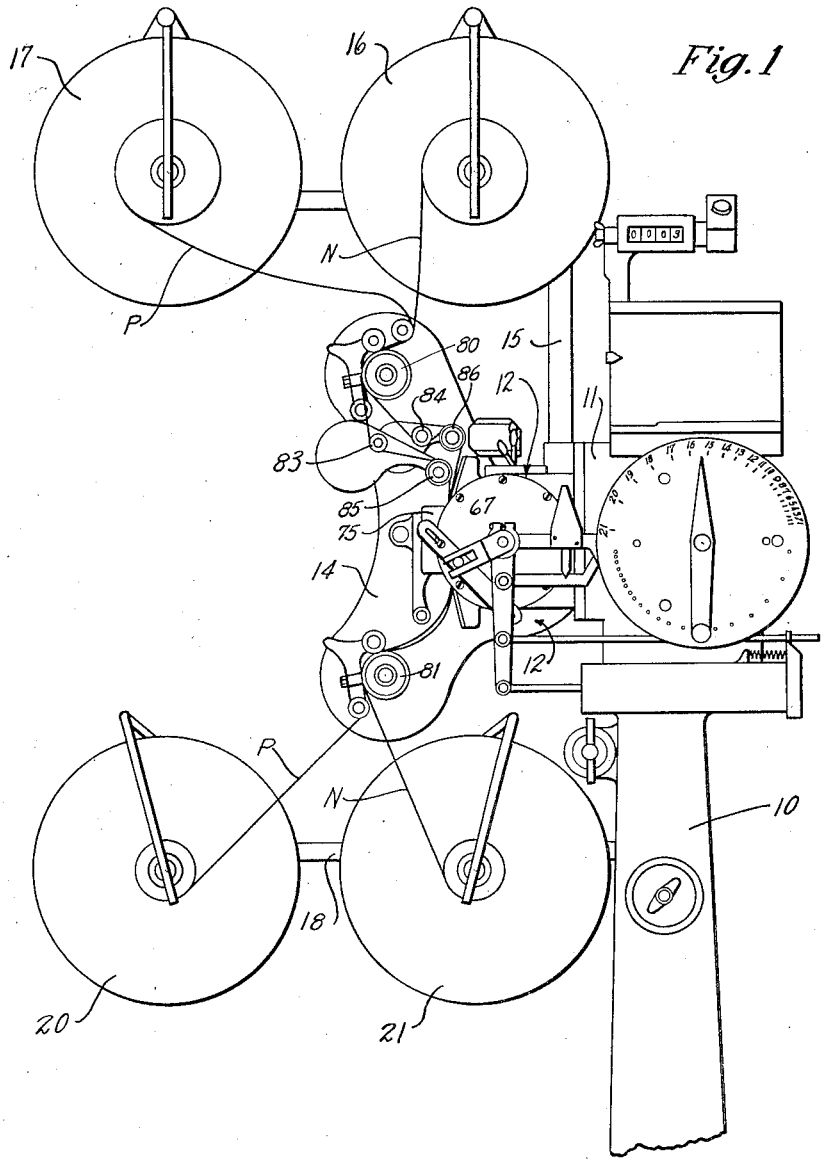
Fig. 1 is a front elevation showing the general features of a typical motion picture printing machine to which the present invention has been adapted.

In Fig. 1 is shown a typical and well known printer to which the present invention has been applied. This printer comprises, generally, a supporting standard 10, a lamp house casting 11 mounted thereon, in the chamber of which is mounted an incandescent lamp, not shown, a casting 12 fixed to the side of the lamp house casting, and being provided with an extension frame 14 upon which are mounted certain film moving and guiding parts, hereinafter more particularly described. An upwardly extending support 15 is mounted upon casting 12, and carried thereby is a pair of film supply spools 16 and 17. Secured to standard 10 is another support 18 extending horizontally below extension frame 14, and mounted on this support are film receiving spools 20 and 21.

Casting 12 and its adjuncts are shown more particularly in the enlarged views of Figures 2 to 4. Referring particularly to Figure 2, the casting is seen to be provided with a connecting portion adjacent lamphouse 11, comprised of upper and lower walls 30 and 31, respectively, and side walls 32 and 33, respectively, the opening between these walls being in communication with the chamber of lamphouse 11, and forming a light conduit 34 to the printing aperture, hereinafter described. These walls 30 to 33 are formed integral with extension frame 14, hereinbefore mentioned, and merge into a hollow cylindric casing portion 35 extending outwardly therefrom. Casing 35 has a horizontal bore 36, which is in the plane of light conduit 34 and opens thereinto. A bush 38 is secured in the portion of bore 36 lying to the rear of conduit 34, and a sprocket shaft 40 is supported for rotation in a concentric bore of this bush. Mounted on sprocket shaft 40 and disposed in line with light conduit 34 is a pair of spaced sprocket wheels 42 and 43, respectively. Sprocket wheel 43 is formed integral with shaft 40 and is located adjacent the hub of bush 38, and sprocket wheel 42 is screwed to a flange 44 provided on the end of sprocket shaft 40. The rim portions 45 of the two sprocket wheels are spaced by the distance between the rows of perforations of a film, and are provided with teeth adapted to drivingly engage such perforations. On the opposite side of sprocket 42, 43 from light conduit 34 there is provided in cylindric case 35 a rectangular opening or cut 46 through which the sprocket extends to engage the film.

A curved plate 50 is secured in the bore 36 of casing 35 just below said rectangular cut 46, and extends upwardly beyond the lower edge thereof to define the lower edge of a printing aperture 51. The upper end of plate 50 is shaped outwardly to form a face 52 lying closely adjacent the film as it passes thereover. Another curved plate 53 is mounted within the bore of casing 35 above the rectangular cut 46 therein, the lower end of the plate extending downwardly beyond the upper edge of the cut to define the upper edge of printing aperture 51. The lower end of this plate is shaped outwardly to form a face 54 lying closely adjacent the film as it passes thereover. The rim portions 45 of the sprocket wheels 42 and 43 overhang inwardly toward each other so as to overhang the edges of plate 53 (see Fig. 4) and thus form light tight joints.

As shown most clearly in Figs. 2 and 4, the upper end of plate 53 is secured to the underside of a curved bracket 60, extending rearwardly over sprocket wheel 42 and formed on the outer end of an arm 61, which arm extends radially from the inner end of shaft 62 supported in axial alinement with sprocket shaft 40. The under side of bracket 60 is provided with an arcal groove 63 concentric with sprocket wheel 42 and through which the rim portion and sprocket teeth of this wheel pass. Shaft 62 runs through a hollow shaft 65, which, in turn, is journaled in a bearing 66 formed concentrically in a cap 67 secured over the outer end of casing 35. Shaft 62 extends out through cap 67 and is secured against rotation at its outer end in the usual manner, as indicated in Figure 1. The means of securing shaft 62 against rotation, and the other adjuncts seen in front of cap 67 in Figure 1 are usual and well known, and need not here be further described.

Fitted in bore 36 and facing light conduit 34 is a light shield 70 having a light opening 71 through which light may pass to reach the printing aperture 51. Opening 71 is varyingly closed to vary the intensity of the printing light by means of a light changing shutter 72, which is carried on the outer end of an arm, not shown, fastened on the inner end of hollow shaft 65, shaft 65 being rotated in the usual manner to control the intensity of the printing light. The above described parts are usual and well known, and since they form no part of the present invention need not here be elaborated in further detail.

The cut 46 in casing 35 is made in a direction substantially tangential to the axis of bore 36, and secured on the tangential surfaces so formed are upper and lower stripper plates 55 and 56, respectively (see Figures 2 and 3), which extend toward each other and terminate just short of the printing aperture.

The usual film gate is shown at 75, mounted upon the upper end of an arm 76 pivotally mounted upon a stud 77 extending from frame 14. Gate 75 is arranged to swing from its inoperative position, indicated in the dotted lines of the figure, to its operative position, within the opening 46 of casing 35 and closely adjacent sprocket wheels 42 and 43. The gate thus backs up the superposed negative and positive films N and P as they pass from the upper stripper plate 55 onto sprocket wheels 42 and 43 to be carried over the printing aperture 51, and are then picked up by the lower stripper plate 56.

Referring now to Figures 1 and 2, the negative film N is threaded from the film spool 16 over a sprocket 80 rotatably mounted on the upper end of frame 14, then behind gate 75 and over sprocket 42, 43, then over a sprocket 81 rotatably mounted on the lower end of frame 14, and finally wound upon the hub of film receiving spool 21. A positive film P is threaded from film spool 17 over sprocket 80 in superposed relation with the negative film, then behind gate 75 and over sprocket 42, 43 in superposed printing relation with the negative film, then over sprocket 81, and finally wound upon the hub of film receiving spool 20. Sprockets 80, 81 and 42, 43 are driven together by a usual train of gears, not shown, and are all driven at the same peripheral speed. Between sprocket 80 and sprocket 42, 43 the positive and negative films pass under movable weighted, tensioning-rollers 83 and 84, and then over stationary idler rollers 85 and 86, respectively.

The foregoing description sets forth the general features of a typical printer for the purpose of facilitating an understanding of the application of the present invention, a preferred specific form of which will now be described in detail.

The device of the present invention includes a plate 90 which is curved to conform to the underside of plate 53, and is secured thereto, as shown best in Figures 2 and 4 (also see Figures 5 to 8, inclusive). The forward end of plate 90 terminates somewhat above the lower edge of plate 53, and is provided with three slots 91, 92 and 93 in which are pivotally mounted masking-wings 94, 95 and 96, respectively, each adapted individually to close a selected area of the printing aperture 51, as hereinafter explained. The two outside masking-wings 94 and 96 include lugs 97 which are taken within slots 91 and 93, and are pivoted therein on a pivot pin 97a, carried in the lower end of plate 90. The middle wing 95 includes a lug 98 that is taken at its upper end within slot 92 and pivoted therein on pin 97a, lug 98 being preferably made of a width somewhat greater than that of lugs 96, this for a purpose which will appear later. Lug 98 extends downwardly below the lower end of plate 90, at the width of slot 92, as shown in Figure 8. Wings 94 and 96 have portions 99 of increased width joining lugs 97 below plate 90, the inner edges thereof just contacting with the edges of lug 98 of the middle wing 95, and the outer edges thereof lying in the extended lines of the edges of plate 90. Middle-wing lug 98 and outside-wing portions 99 extend downwardly to the lower edge 53a of plate 53 (see Figure 2). At this point the outside wings are undercut from their inner edges to form reduced mask portions 100 and 101, respectively, of widths just greater than the width of a sound record track, as hereinafter explained, while the middle wing is correspondingly increased in width and forms a mask portion 102, the outside edges of which lie just in contact with the inside edge of mask portions 100 and 101 of the outside wings. (See Figure 10).

Fitted on the outer surfaces of mask portions 100 and 101 of the two outside wings and 102 of the middle wing, are aperture-closing mask elements 103, 104 and 105. These elements are configured at their upper and lower edges 106 and 107, respectively, to fit snugly—when in forward or masking position,—between the upper and lower plate edges 53a and 52a which define the upper and lower edges of the printing aperture 51. (See Fig. 2.) The mask elements thus completely fill the aperture, when in masking position, and their outer surfaces are closely adjacent the inner film so that the masking takes place directly at the film surface.

Plate 90 is made, though not necessarily so, of the same width as plate 53, and is thus slightly greater in width than the spacing between the rim portions 45 of the two sprocket wheels, which overhang its two edges as shown in Fig. 4. The three elements 103, 104 and 105, however, are together just equal to the width between the rows of perforations on the films, and therefore fit nicely between the rim portions of the two sprocket wheels, as shown in Fig. 3. The width of elements 103 and 104 of the outside masks are each equal to the width of a sound record track; and the device is so proportioned and disposed that one or the other of elements 103 and 104 will lie directly under and in register with the sound track area of a film passing over sprocket 42, 43, the particular element depending in any given case at which edge of the film the sound track happens to be located. Then—since the total width of the three elements 103, 104 and 105 is equal to to the width between the sprocket wheels, or in other words to the film width between perforations—the other of the outside elements 103 and 104, taken with the middle element 105, are together equal in width to the film width between perforations, less the width of a sound track—or in other words to the width of the picture area of the film. Thus either outside element forms a sound track mask, while either outside element together with the middle element form a picture area mask. And no matter whether the sound track is at one edge or the other of the printing area in any given case, one of the outside elements will register with the sound track and form a mask therefore, while the other outside element, taken with the middle element, together register with the picture area, and thus together comprise a single mask for that area of the film.

Each of the wings 94, 95 and 96 may be swung to an inoperative position, as is wing 96 in Figure 2, thus allowing printing to be done in the corresponding area of aperture 51. The preferred means of shifting the wings between operative and inoperative positions will now be described.

Secured to the inner edge of plate 90 and extending downwardly therefrom is a back plate 110 (see Figures 2, 5 and 7). The lower edge of this plate is provided with three slots 111, and pivotally mounted therein upon a pivot pin 112 running lengthwise through the lower edge of plate 110, are three depending, swinging arms 113, the lower ends of which are provided with open ended slots 114. Wings 94, 95 and 96 are provided, just below their pivotal connections with the forward end of plate 90, with slots 115 disposed in the planes of slots 114. The forward ends of links 117 extend into slots 115 and are pivotally connected therein to the respective wings by means of pivot pins 118. The rear ends of links 117 extend into slots 114 and are pivotally connected therein to the respective arms 113 by means of pivot pins 119. Also pivotally connected within slots 114 to the lower ends of arms 113 are links 120, which extend rearwardly to connect with the lower ends of wing-actuating levers 121.

Levers 121 extend upwardly and outside of casing 36 through an aperture 122 provided in the upper wall 30 of light conduit 34. The levers also extend through openings 123 of a plate 124 secured to the upper surface of wall 30, and are pivotally supported therein by means of a pivot pin 125 that passes horizontally through the plate in the line of openings 123. The upper ends of levers 121 are provided with handles 126, by means of which the levers are shifted to operate the masking-wings.

In Fig. 5 the levers are all shown in position to hold the masking-wings forward or in masking position. In Fig. 2 the front lever is shown shifted forward, which, through the medium of links 120 and 117, has swung masking-wing 96 back to an inoperative position out of the line of the light rays passing from light opening 71 to the printing aperture.

Connected, as shown in Figs. 2 and 5, between plate 90 and links 117 are tension springs 145, which are disposed in a manner to yieldingly hold the wings both in masking position and in inoperative position. This result is accomplished, as will be recognized from an inspection of the drawings, by reason of the fact that the links 117, to which the springs are connected, are lowered slightly by the downward swinging of the wings and of supporting arms 113 during the initial movement from either position, which thereby slightly expands the springs to resist the initial movement.

As has previously been described, the picture area of a film is masked by the middle wing and an outside wing positioned side by side in the printing aperture and acting together. It is necessary, however, when the masks are being so utilized, to provide some means for preventing light rays from passing between their juncture and fogging the film. For this purpose, light shields 130 are preferably provided to cover the junctures between the outside and middle wings. These shields may be formed and mounted as follows: The upper end of lug 98 of the middle wing is provided with two slots 131, and the inner edges of shields 130 are provided at their upper ends with lugs 132 which are taken in these slots and pivotally held therein by means of pivot pin 97a (see Figs. 8 and 9). With the masking-wings forward, as in Figs. 5 and 6, the light shields lie flat against their inner surfaces, and are curved as shown to conform thereto. In the form shown in the drawings, the shields comprise a relatively narrow shank 134 on the upper end of which lug 132 is formed, and an enlarged shield portion 135 on the lower end thereof and extending outwardly under links 117 to cover the juncture between the outside and middle wings at the area of the printing aperture. (See Fig. 6.) It will be seen that when an outside wing is swung back, as in wing 96 in Fig. 2, the corresponding shield will also be carried back, as clearly shown in Fig. 2. It will also be recognized that when the middle wing is swung back, both light shields will be carried back thereby to this same position. To retain the shields normally against the inner surface of the wings, whether the wings are in masking or in inoperative position, there is provided a pair of slots 138 in plate 90, and carried therein are springs 139 coiled about a pin 140 running therethrough, the ends 141 of the springs being connected to plate 90, and the other ends 142 being extended downwardly and pressing against the rear surfaces of the respective shields. Thus, when the middle wing is back and no shielding is required, both light shields are back; when either outside wing is back, the corresponding light shield is back; but when the middle wing and an outside wing are forward, the light shield covering their juncture is also forward, and makes of them a single light-tight mask.

The method of operating the masks and handling the films during the printing of positives will now be described. In the present discussion, it will be assumed that the sound track on the negative is located at the left hand edge of the picture area when viewed from the emulsion side and the film is arranged to move "foot" first, as indicated in Fig. 11. To print the record R of sound negative SN upon the positive, while masking the picture area of the film, the masking-wings are actuated by means of handles 126 to take the positions of Fig. 8. Wing 94 is then back, allowing the sound record to be printed through the open aperture area indicated in Fig. 11, while wings 95 and 96 are forward and mask the picture area of the films. When the films have been run through the machine in this manner, the positive roll is removed from receiving spool 20, turned over, and replaced on supply spool 17. This causes the positive film to be arranged to run through the machine this time "head" first instead of "foot" first, and the area of the positive in which the pictures are to be printed now to be at the left hand edge of the sound track, whereas it will be remembered that it was at right hand edge during the printing of the sound record. The action negative AN is then arranged in the machine to travel "head" first, so that the action is at the left hand edge of the sound track (as in Fig. 12), to correspond with the action area of the positive; and the masks are then arranged to print the action by merely shifting the middle wing back to its inoperative position along side of wing 94, as shown in Fig. 8a. Wings 94 and 95 are then seen to be back, allowing the action to be printed through the open aperture area indicated in Fig. 12, while wing 96 remains forward to mask the previously printed sound track.

The operation is thus seen to consist in covering the picture area of the positive with a mask while the sound track is printed; then reversing the positive from right to left and end for end, and splitting the said mask, the outer part thereof being left in position to cover the previously printed sound track—which, due to the reversal of the film, is now on the other edge thereof with respect to the masks,—while the inner portion of the mask is moved back to uncover the action area of the films.

It will be obvious how the operation may be reversed, if desired, printing the action first and the sound track last.

In case it is desired to run the films through the machine "head" first as the sound track is printed, and then "foot" first as the action is printed—which is just reversed to the order above described—the masks will first be arranged as in Fig. 8b, to print the sound track and mask the action area, and then split and arranged as in Fig. 8c to print the action and mask the previously printed sound track, as will now be understood without further explanation.

The described mechanism is thus universally applicable to obviate the necessity of rewinding film between prints, and regardless of whether the sound track is to be either at the right or left edge when viewed in a certain aspect—say, for instance, viewing the emulsion face with the foot down.

If, on the other hand, all sound films were to have their sound tracks at one definite edge, when viewed in that certain aspect, and further if it be practicable and convenient to have all negative films come initially to the printer rolled in one certain way, then operation can always be carried on with the masks assuming only two of their four possible operative positions; say, for instance, the two positions illustrated in Figs. 8 and 8a, the aperture openings for each of these two positions being indicated in dotted lines in Figs. 11 and 12, respectively. In such cases the one of the sound track masks that remains open, wing 94 in the present illustration, can be omitted from the construction entirely; while the other sound track mask, wing 96, which is seen to be permanently closed, need not be made removable but can continuously close that side edge of the aperture.

In fact, that non-moving sound track mask then, in effect, becomes a fixed side edge or wall of the permanent aperture—the permanent aperture then being, for instance, of an area corresponding to the combined areas of elements 103 and 105 in Fig. 8, and as indicated in the dotted lines of Fig. 13. Thus if printing always takes place as in the foregoing paragraph, the complete aperture need be only of this reduced area, the right hand wing remaining closed at all times, as indicated in Fig. 13, and thus forming virtually a permanent part of the whole aperture definition.

The preferred form of the invention, however, includes the three complete, removable masks, which provide for any possible contingency of printing.

It will be understood the drawings and description are to be considered merely as illustrative of and not restrictive on the broader claims appended hereto, for various changes in design, structure and arrangement may be made without departing from the spirit and scope of said claims.

We claim:

1. In a motion picture printing machine having a printing aperture of the width of the total printing area on a given film, and means for moving the film longitudinally past the printing aperture, the combination of a pair of independently movable sound track masks, each adapted to be moved to cover an area at the respective side edges of the aperture, the width of each of said areas being equal to the width of a sound track, and another independently movable mask adapted to be moved to cover the entire area of said aperture between said side edge areas.

2. In a motion picture printing machine having a printing aperture of the width of the total printing area on a given film, said total printing area being composed of an action area and a sound track area the last extending along one edge of the action are and being of a definite width and means for moving the film longitudinally past the printing aperture, the combination of three independently removable masks extending over the said printing aperture longitudinally in the direction of film movement and adapted to meet along their longitudinal edges, the two outside masks being each of the width of the sound track area, and the total width of the three masks being equal to the total width of the aperture and total printing area.

3. In a motion picture printing machine having a printing aperture of the width of the total printing area on a given film, said total printing area being composed of an action area and a sound track area the last extending along one edge of the action area and being of a definite width and means for moving the film longitudinally past the printing aperture, the combination of three independently removable masks extending over the said printing aperture longitudinally in the direction of film movement and adapted to meet along their longitudinal edges the two outside masks being each of the width of the sound track area, and the total width of the three masks being equal to the total width of the aperture and the total printing area, and means for covering the edge to edge junctures of adjacent masks.

4. In a motion picture printing machine having a printing aperture of the width of the total printing area on a given film, said total printing area being composed of an action area and a sound track area the last extending along one edge of the action area and being of a definite width, and means for moving the film longitudinally past the printing aperture, the combination of three independently removable masks extending over the said printing aperture longitudinally in the direction of film movement and adapted to meet along their longitudinal edges, the two outside masks being each of the width of the sound track area, and the total width of the three masks being equal to the total width of the aperture and the total prining area, and a pair of light shields, one covering each of the two edge to edge junctures of the three adjacent masks.

5. In a motion picture printing machine having a printing aperture, and means for moving the film longitudinally past said printing aperture, the combination of a pair of aperture-covering masks meeting edge to edge, and a light shield overlapping both masks at their meeting edges.

6. In a motion picture printing machine having a printing aperture, and means for moving the film longitudinally past said printing aperture, the combination of a pair of aperture-covering masks meeting edge to edge, and rearwardly removable from said printing aperture, and a light shield mounted rearward of and overlapping said masks at their meeting edges, said shield being rearwardly removable with either of said masks.

7. In a motion picture printing machine having a printing aperture, and means for moving the film longitudinally past said printing aperture, the combination of a pair of aperture-covering masks meeting edge to edge, and rearwardly removable from said printing aperture, and a light shield mounted rearward of and overlapping said masks at their meeting edges, said light shield being spring-urged into contact with said masks, and being rearwardly removable with either of said masks.

8. In a motion picture printing machine having a printing aperture, and means for moving the film longitudinally past said printing aperture, the combination of a pair of aperture-covering masks pivotally mounted to swing rearward away from said aperture, and adapted to meet edge to edge, and a light shield mounted rearward of and overlapping said masks at their meeting edges, said light shield being mounted to swing rearwardly with either of said masks, and being spring-urged into contact with said masks.

9. In a motion picture printing machine having a printing aperture, and means for moving the film longitudinally past said printing aperture, the combination of a pair of aperture covering masks pivotally mounted to swing rearward away from said aperture, and adapted to meet edge to edge, and a light shield pivotally mounted rearward of and overlapping said masks at their meeting edges, said light shield being pivotally removable rearwardly with either of said masks, and being spring-urged forwardly against said masks.

10. In a motion picture printing machine having a printing aperture of the width of the total printing area on a given film, and means for moving the film longitudinally past the printing aperture, the combination of a sound track mask adapted to cover an area at a side edge of said aperture, the width of said area being equal to the width of a sound track, and an independently removable mask extending from said side edge mask across the width of the exposure aperture and terminating short of the opposite side edge by a distance equal to the width of said side edge mask.

11. In a motion picture printing machine having a printing aperture of the width of the total printing area on a given film, and means for moving the film longitudinally past the printing aperture, the combination of a central removable mask adapted to cover the aperture opening except two side edge areas each equal in width to a sound track, and a side edge masking part separate of the central removable mask and adapted to close one of the otherwise open areas at a side edge.

12. A motion picture printer having a printing aperture of a width less than the printing width of a given film by an amount equal to the width of the sound track of that film, means for moving a film longitudinally past the aperture with the print receiving width overlapping one side edge of the aperture by a distance equal to the width of the sound track, and a separate removable mask filling said aperture except for an area at the side edge opposite the overlapped aperture edge and of a width equal to the width of a sound track.

13. In a motion picture printing machine having a printing aperture of the width of the total printing area on the film, and means for moving the film longitudinally past the printing aperture, the combination of a central removable mask adapted to cover the aperture opening except two side edge areas each equal in width to a sound track, and a side edge masking part adapted to close one of the otherwise open areas at a side edge and to lie in said aperture edge to edge with said central removable mask, and a light shield adapted to overlap their meeting edges of the said mask.

14. In a motion picture printing machine having a printing aperture of the width of the total printing area on a given film, said total printing area being composed of an action area and a sound track area the last extending along one edge of the action area and being of a definite width, the combination of masking means for the printing aperture providing three masking areas extending side by side over said printing aperture longitudinally in the direction of film movement, the two outside masking areas each having a width equal to the width of a sound track, and the total width of the three masking areas being equal to the total width of the aperture and total printing area, said masking means being operable to shift said masking areas to uncover either one of the sound track areas at the edges of the printing aperture, or to uncover either one of said sound track areas together with the intermediate area between said sound track areas.

In witness that we claim the foregoing we have hereunto subscribed our names this 6 day of May, 1929.

FRANK E. GARBUTT.
THOMAS M. INGMAN.